（12) United States Patent
Roberts et al.

(10) Patent No.: US 8,587,215 B2
(45) Date of Patent: Nov. 19, 2013

(54) SELF-DIMMING OLED LIGHTING SYSTEM AND CONTROL METHOD

(75) Inventors: Bruce Richard Roberts, Mentor-on-the-Lake, OH (US); Deeder Aurongzeb, Mayfield Hts., OH (US); Josip Brnada, Willoughby, OH (US)

(73) Assignee: General Electric Company, Schenectady, NY (US)

( * ) Notice: Subject to any disclaimer, the term of this patent is extended or adjusted under 35 U.S.C. 154(b) by 308 days.

(21) Appl. No.: 13/101,452

(22) Filed: May 5, 2011

(65) Prior Publication Data

US 2012/0280636 A1    Nov. 8, 2012

(51) Int. Cl.
*H05B 37/02*    (2006.01)

(52) U.S. Cl.
USPC .......... 315/291; 315/294; 315/247; 315/276; 315/169.1; 315/193

(58) Field of Classification Search
USPC ............ 315/291, 297, 307–309, 209 R, 226, 315/294, 219, 224, 312, 247, 225, 276, 315/169.1, 169.3, 172, 173, 185 R, 188, 193
See application file for complete search history.

(56) References Cited

U.S. PATENT DOCUMENTS

| 2009/0256812 | A1* | 10/2009 | Ha et al. .................. 345/173 |
| 2010/0007644 | A1* | 1/2010 | Kim et al. ................. 345/211 |
| 2010/0026204 | A1* | 2/2010 | Hente et al. .............. 315/291 |
| 2010/0033095 | A1* | 2/2010 | Sadwick .................. 315/51 |
| 2010/0231548 | A1 | 9/2010 | Mangione-Smith et al. |

FOREIGN PATENT DOCUMENTS

| EP | 2110736 A2 | 10/2009 |
| KR | 20090009387 A | 1/2009 |

OTHER PUBLICATIONS

PCT Search Report and Written Opinion dated Aug. 20, 2012 from corresponding Application No. PCT/US2012/036202.

* cited by examiner

*Primary Examiner* — Shawki Ismail
*Assistant Examiner* — Christopher Lo
(74) *Attorney, Agent, or Firm* — Fay Sharpe LLP

(57) ABSTRACT

Lighting devices and operating methods are presented in which voltage or current perturbations of an OLED caused by a user pressing the OLED are monitored while the OLED is providing general lighting, and one or more lighting control signals are generated based on the sensed perturbations.

19 Claims, 15 Drawing Sheets

SELF-DIMMING OLED LIGHTING SYSTEM AND CONTROL METHOD

BACKGROUND OF THE DISCLOSURE

Organic light emitting diode (OLED) technology has recently become the subject of a large amount of new product development activity. OLEDs have gained popularity due to several technological advantages, including very thin and flexible form factor, high efficiency, high light output, etc. These devices, moreover can be adapted for use in both indoor and outdoor installations, and can be used for small area and/or large area lighting applications. As with other sources of general illumination, a user typically operates an OLED-based device using a wall or table-mounted switch and/or a dimmer control to set the desired light output. However, such external control switches/dimmers are expensive and typically require permanent installation on a wall, table surface, etc. Thus, there remains a need for improved lighting devices and control apparatus therefor.

SUMMARY OF THE DISCLOSURE

The present disclosure provides lighting devices and methods for operating lighting and other devices in which a user can press an OLED panel or particular portions thereof to initiate one or more lighting control functions, such as dimming, on/off control, etc. and/or control operations with respect to other types of devices and systems. The inventors have appreciated that organic materials are flexible and are sensitive to external stresses. Thus, upon compression of an OLED panel, the OLED resistivity and/or capacitance may change due to reduced intermolecular distance and increased orbital overlap. This can lead to higher rates of electron transfer between neighboring molecules, resulting in disturbances or perturbations in a voltage measured across a driven OLED or an array thereof or in a current flowing through the OLED(s). The present disclosure provides techniques and apparatus by which such user initiated voltage or current perturbations can be detected and used for lighting control purposes. This, in turn, facilitates various advances over the state-of-the-art, including the ability for an OLED device to be self-dimming with the user merely pressing the light panel for dimming control of the actuated device, as well as for controlling other connected devices including other lighting devices and external devices providing other functions. In this manner, for instance, a user can press a wall mounted OLED lighting device to turn other devices (e.g., ceiling mounted lights) on or off, and/or to selectively dim one or more other devices. Moreover, the user-actuatable OLED lighting devices can be used to initiate control of a multitude of other controllable devices and systems, such as ceiling fans, home appliances, etc.

A lighting device is provided, which includes a light panel with a pair of power connections for receiving DC electrical power from a driver, as well as one or more OLEDs that provide general lighting using current from the driver. The lighting device further includes an actuation detect circuit that senses perturbations in a voltage across the light panel power connections or in a current flowing through the at least one OLED caused by physical actuation of the OLEDs by a user while the one or more OLEDs are providing general lighting. The actuation detect circuit selectively provides one or more actuation signals to an associated driver or to one or more external devices based in whole or in part on the sensed perturbation.

In certain embodiments, the actuation detect circuit compares the amplitude of the perturbation to one or more thresholds, and provides one or more actuation signals according to a threshold comparison(s). In this manner, different control actions can be taken based upon how hard the user presses the OLED and/or upon which portion of the OLED is pressed, thus allowing more detailed user control of lighting conditions and/or operational parameters of external devices.

In certain embodiments, moreover, the lighting device can differentiate between accidental actuations and those intended for lighting control. In some implementations, the lighting device may include a processor providing one or more actuation signals or values if a plurality of perturbations are detected within a non-zero predetermined time. Thus, for instance, the device can selectively perform a control action if a user presses the OLED two or more times, and refrain from taking action if the OLED is only pressed once.

In some embodiments, a communications interface is provided to transmit messages to one or more external devices, and the processor or actuation detect circuit provides at least one actuation signal or Value to the communications interface for transmission in response to actuation of the OLED.

In certain embodiments, the lighting device includes an internal driver circuit to provide power to the user-actuatable light panel. In some implementations, the actuation detect circuit provides the actuation signal to the on-hoard driver for self-dimming of the actuated OLED, with the driver selectively changing the amount of power provided to the light panel based at least in part on the received actuation signal. In other embodiments, the actuation detect circuit can directly provide the actuation signal to one or more external devices for control thereof, or an actuation signal or value can be provided to such external devices via an on-board communications interface.

In certain embodiments, the actuation detect circuit includes an amplifier receiving an AC-coupled signal from one of the light panel power connections as well as a comparator that compares the amplified signal with one or more thresholds. A pulse detector circuit detects the output of the comparator and provides an output to a latch which provides the actuation signal(s).

An actuation detect circuit is provided for detection of physical actuation of one or more OLEDs. The circuit includes connections for sensing a voltage or current associated with the OLED(s), as well as a detect circuit that senses a perturbation in a voltage across the OLED(s) or a perturbation in a current flowing through the OLED(s) while the OLED is powered to provide general lighting.

A power source is provided for lighting system, which includes a driver circuit with outputs for providing DC power to at least one OLED of a connected light panel for general lighting. The power source further includes an actuation detect circuit coupled with the connected light panel in order to sense a perturbation in a voltage or current associated with the connected light panel caused by physical actuation of the OLED by a user while the driver circuit provides power to the OLED. The actuation detect circuit selectively provides one or more actuation signals based at least in part on the sensed perturbation. In some embodiments, the actuation signal is provided to the driver which selectively adjusts the amount of power provided to the OLED at least partially according to the actuation signal. In certain embodiments, moreover, the power source includes a signal output and the actuation detect circuit provides the actuation signal or signals to the signal output.

A method is provided for controlling one or more devices, which includes providing DC electrical power to a light panel that includes one or more OLEDs to provide general lighting. A perturbation caused by physical actuation of the OLED is sensed in a voltage across light panel power connections or in a current flowing through the OLED while the OLED provides general lighting. The method further includes controlling one or more operational parameters of at least one lighting or other type device based at least in part on the sensed perturbation.

BRIEF DESCRIPTION OF THE DRAWINGS

One or more exemplary embodiments are set forth in the following detailed description and the drawings, in which.

DETAILED DESCRIPTION OF THE PREFERRED EMBODIMENTS

Figure 1:
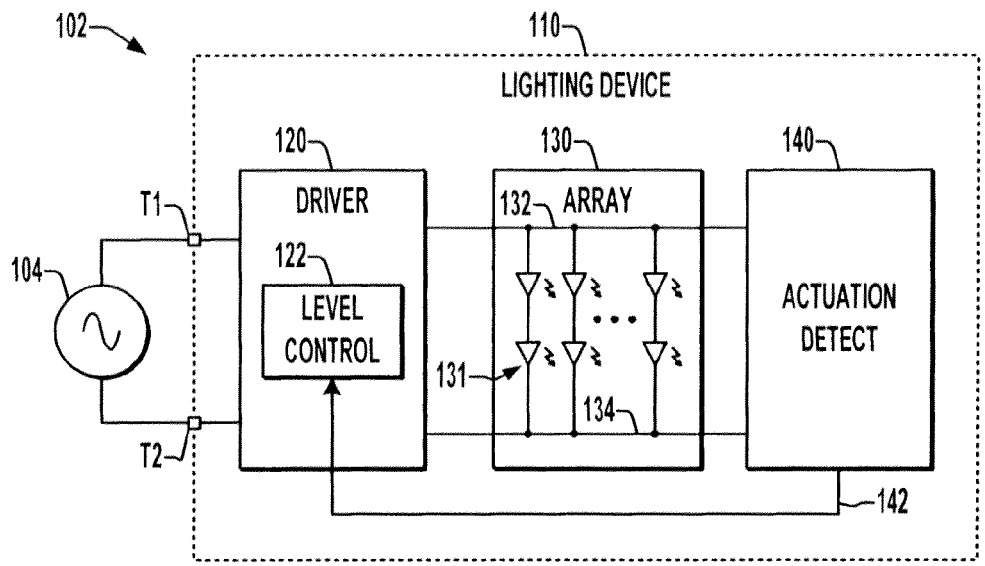
FIG. 1 is a schematic diagram illustrating an exemplary self-dimming OLED-based lighting device with an onboard driver and an actuation detect circuit for detecting user-initiated dimming control actions by pressing one or more OLEDs of a light panel in accordance with the present disclosure.
Figure 15:
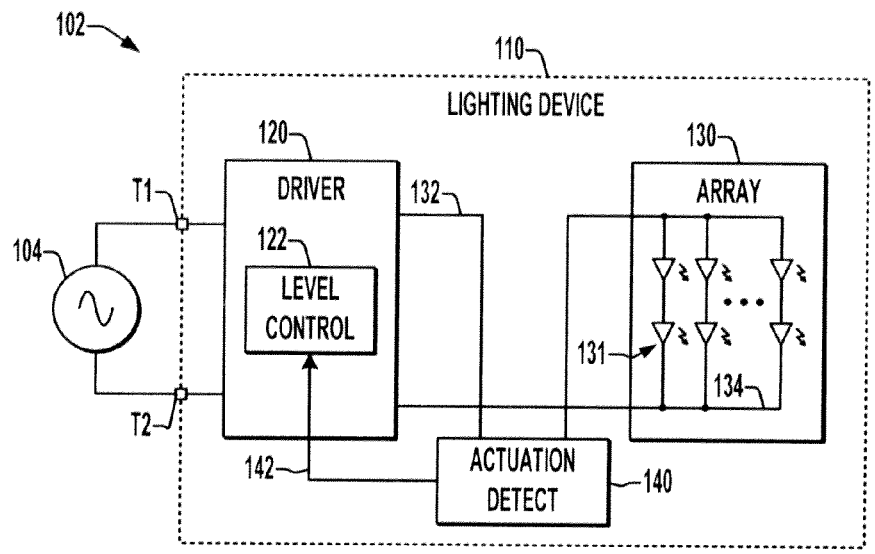
FIGS. 15 and 16 are schematic diagrams illustrating exemplary self-dimming OLED-based lighting devices with an onboard and external drivers, respectively, including an actuation detect circuit for detecting current perturbations caused by a user pressing one or more OLEDs of a light panel in accordance with the present disclosure.
Figure 16:
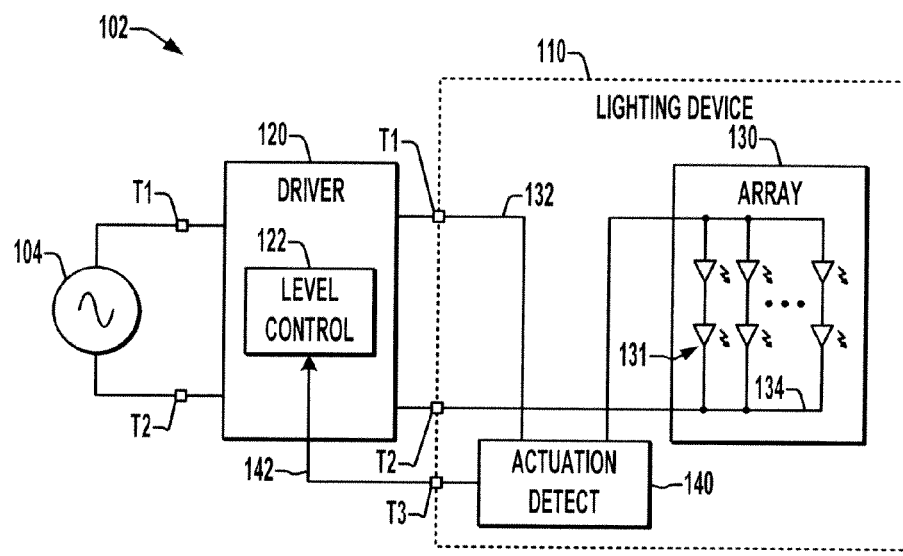

Referring now to the drawings, like reference numerals are used to refer to like elements throughout and the various features are not necessarily drawn to scale. FIG. 1 illustrates a lighting system 102 including an exemplary OLED-based lighting device 110 receiving AC input power from a source 104 via input terminals T1 and T2. The two terminal device 110 is a self-dimming device, in which a user can physically actuate the device 110 for controlling the general illumination (dimming) level by pressing an illuminated portion of the device. And on-board driver 120 receives the AC input power from the source 104 and provides a regulated DC output current to an OLED-based light panel 130 having one or more OLEDs 131. The driver 120 is a constant current source which regulates a generally constant output current via a level control circuit 122, to thereby provide a generally constant current and thus a generally constant light output in steady state operation. The level control circuit 122 provides setpoint value to a current regulator of the driver 120, and may selectively adjust this driver setpoint value according to a received actuation signal input 142. FIGS. 15 and 16 below illustrate alternative embodiments in which a constant voltage driver circuit 120 is used, with an actuation detect circuit 140 detecting current perturbations 222.

The light panel 130 can be of any suitable configuration, shape and form factor, such as a thin panel with one or more OLED devices 131, commonly configured as strips or cells on one flat surface of the panel 130 for providing general lighting output emitter the outward from the flat surface. En one example, the device 110 can be mounted to a wall surface, a tabletop, or other location that is accessible by an operator (user), with one or more OLEDs 131 facing outward so as to provide general lighting for the user. In certain embodiments, one or more non-OLED light emitting components can be included in the light panel 130, such as LEDs or other DC-driven lighting components, with the panel 130 including at least one user-actuatable OLED 131 connected, directly or indirectly, between the DC power terminals 132 and 134 to allow detection by the actuation detect circuit 140 of a user pressing the OLED 131. The driver 120 provides input power to the light panel 130 by way of light panel power connections 132 and 134 to create a path for conduction of driver current from a positive DC output of the driver by the first connection 132, through the OLED(s) 131, and returning through the second power connection 134 to a negative return terminal of the driver 120.

Figure 13:
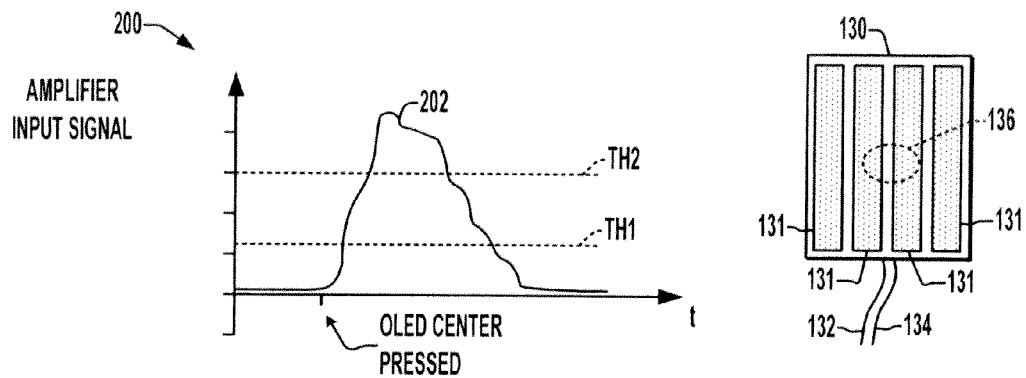
FIGS. 13 and 14 are graphs illustrating detection and differentiation between voltage perturbations caused by a user pressing different portions of an OLED panel using multiple comparator thresholds.
Figure 14:
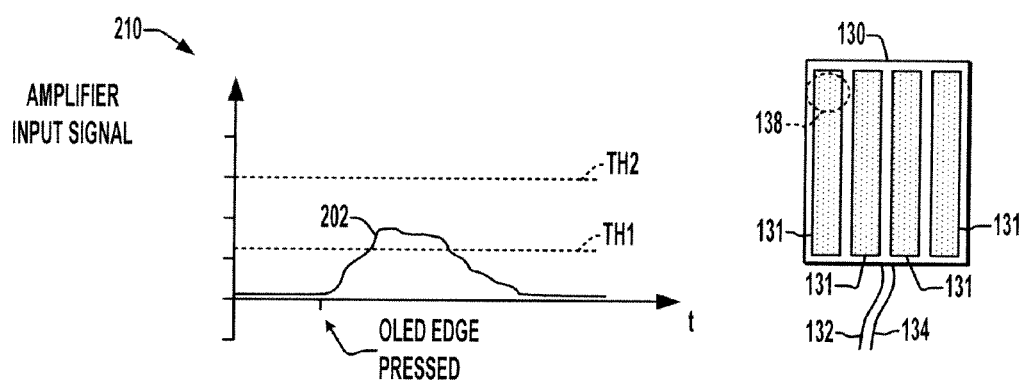

Referring also to FIGS. 13 and 14, in normal steady state operation, conduction of the DC driver current through the OLEDs 131 of the panel 130 creates a generally DC voltage across the terminals 132 and 134. The device 110 includes an actuation detect circuit 140 with connections to the terminals 132 and 134 to sense voltage perturbations 202 (FIGS. 13 and 14) in the voltage across the light panel terminals that are caused by physical actuation of the OLED(s) 131 by a user.

The actuation detect circuit 140 selectively provides the actuation signal(s) 142 to the level control circuit 122 of the driver 120 at least partially according to the voltage perturbations 202 sensed in the voltage across the terminals 132 and 134. In this embodiment, the driver 120 is integrated into the lighting device 110, and directly receives the actuation signal 142. As a result, a simple two terminal device is provided, which provides its own dimming control allowing the user to simply press the panel 130 to cause the level control 122 to change the light output level.

Figure 2:
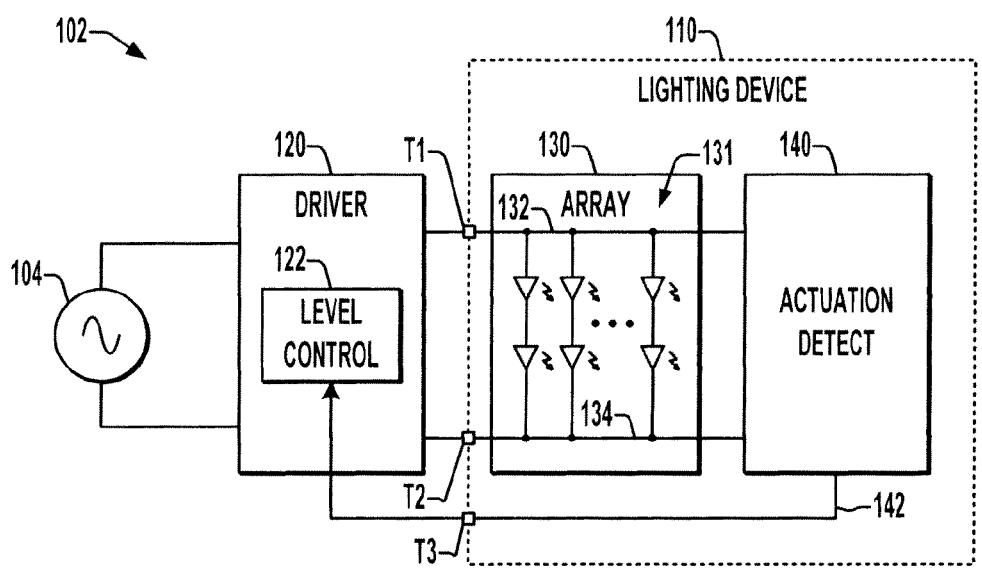
FIG. 2 is a schematic diagram illustrating another lighting device having an actuation detect circuit, which is driven by an external driver with the driver controlling a dimming level according to an actuation signal provided by the actuation detect circuit.

FIG. 2 illustrates an alternate embodiment, in which the lighting device 110 includes first and second terminals T1 and 12 connected to the light panel power connections 132 and 134, respectively, for receiving input DC electrical power from an external driver 120, as well as a third terminal T3 for providing an actuation signal 142 as an output to one or more external devices. In this example, the system 102 includes an external DC driver 120 receiving power from an AC input source 104, where the driver 120 provides a DC output current to the user-actuatable light panel 130 via the terminals T1 and T2. In this embodiment, moreover, a level control circuit 122 of the driver 120 is connected to the third terminal 13 in order to receive the actuation signal 142 from the actuation detect circuit 140 of the lighting device 110. The level control circuit 122 in this embodiment also operates to selectively change the power output level of the driver 120 (e.g., the setpoint value for the driver's internal current regulator) according to the received signal 142. Like the embodiment of FIG. 1, the user can simply press or otherwise physically actuate one or more OLEDs 131 of the light panel 130, with the actuation detect circuit 140 detecting a resulting perturbation 202 in the voltage across the terminals 132 and 134 and generating one or more actuation signals 142 in response to the user's actuation of the light panel 130. Thus, this embodiment also allows the user to set the light output level of the device 110 by actuating the device 110 itself, without requiring an external switch or dimming control device.

Figure 3:
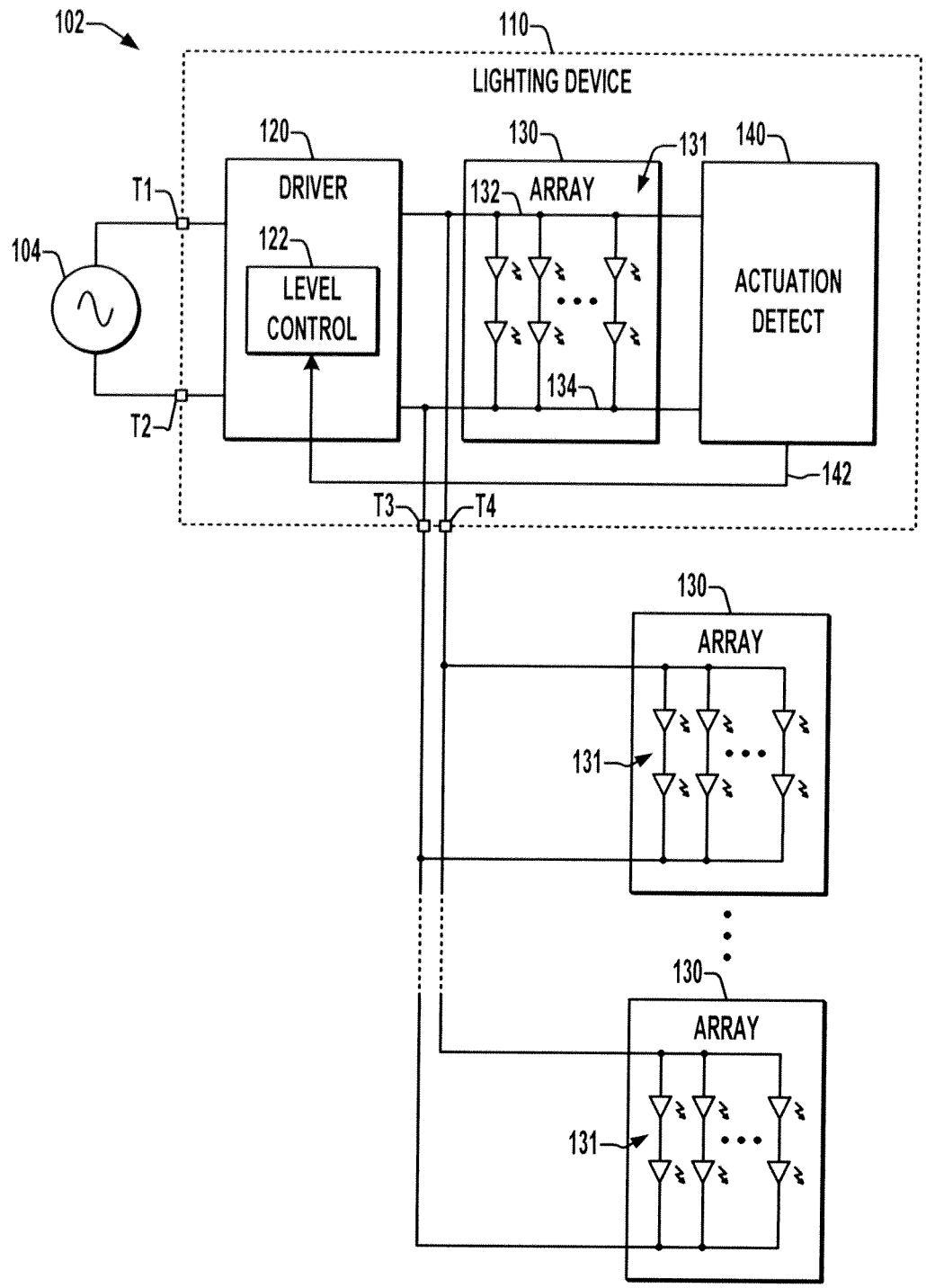
FIG. 3 is a schematic diagram illustrating a user-actuatable OLED-based lighting device with an on-board driver providing self-dimming control for and on-board OLED array or light panel as well as for dimming one or more external light panels or other type of external device(s)
Figure 4:
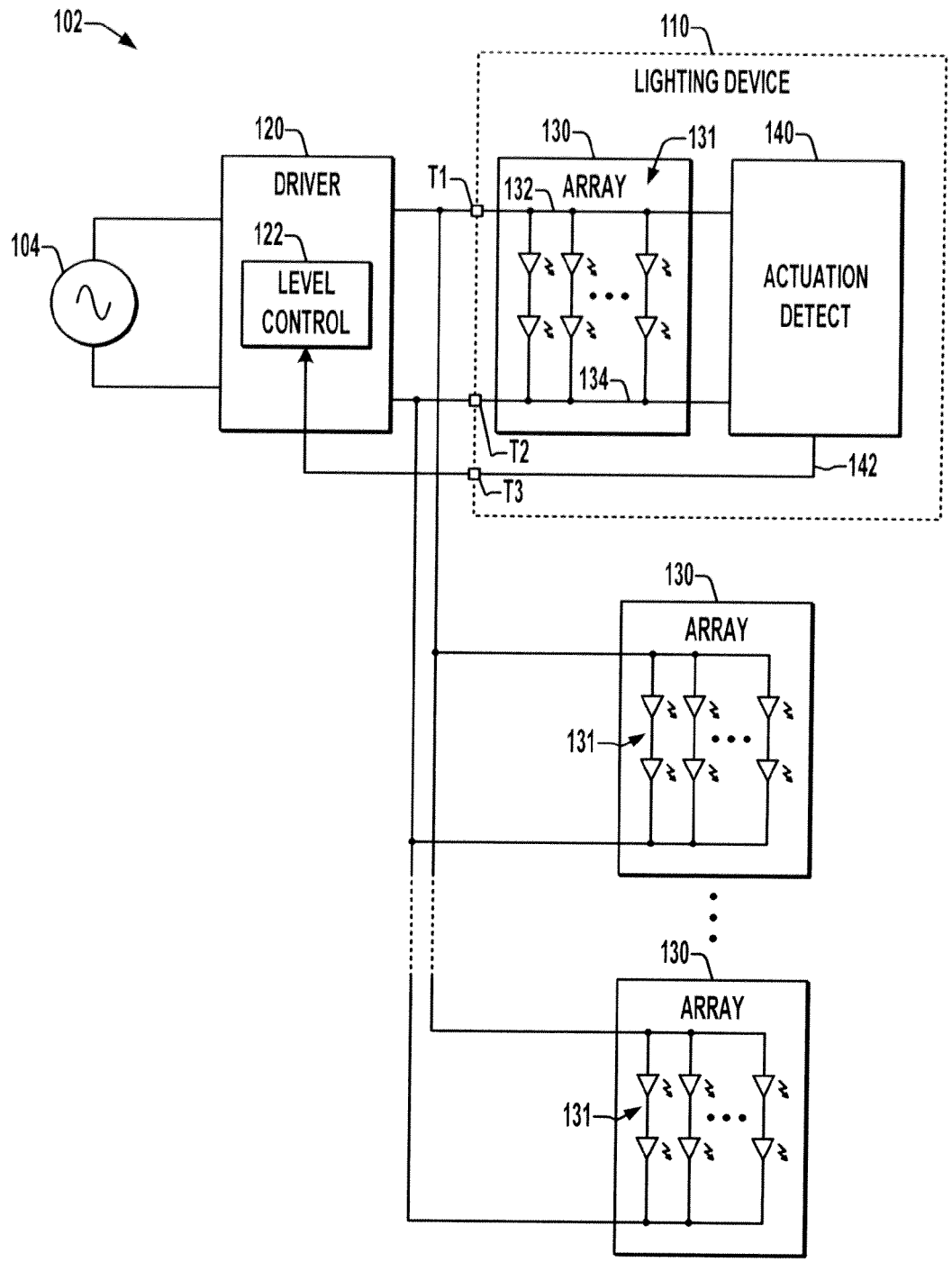
FIG. 4 is a schematic diagram illustrating another lighting system with a user-actuatable OLED-based lighting device providing an actuation signal for dimming control by an external driver that provides power to multiple lighting devices.

FIGS. 3 and 4 illustrate exemplary OLED-based user-actuatable lighting devices 110 forming part of a lighting system 102, in which a shared DC driver 120 provides DC output power to multiple light panels 130, some of which are external to the lighting device 110. In the example of FIG. 3, the shared DC driver circuit 120 is integral to the user-actuatable lighting device 110, whereas the example shown in FIG. 4 uses an external driver 120. Moreover, the lighting device 110 in FIG. 3 is a four-terminal device having two AC input terminals T1 and T2 as well as two DC output terminals T3 and T4, while the device 110 in FIG. 4 includes terminals T1 and T2 for receiving D 7 input power as well as terminal T3 for providing an actuation signal output 142 to the level control circuit 122 of the driver 120.

Figure 5:
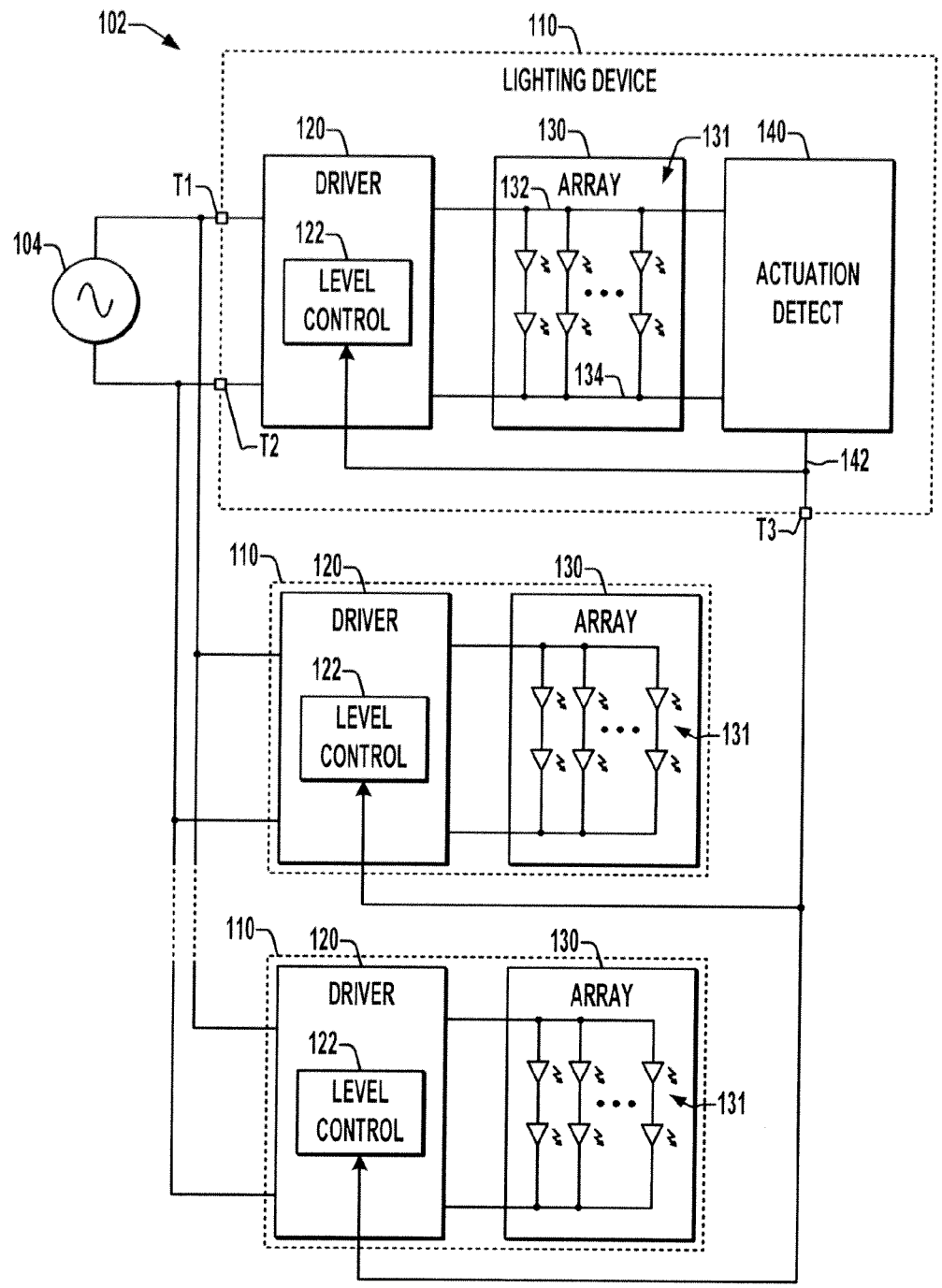
FIGS. 5-8 illustrate further embodiments in which multiple lighting devices are dimmed according to an actuation signal provided by a user-actuatable OLED-based device.
Figure 6:
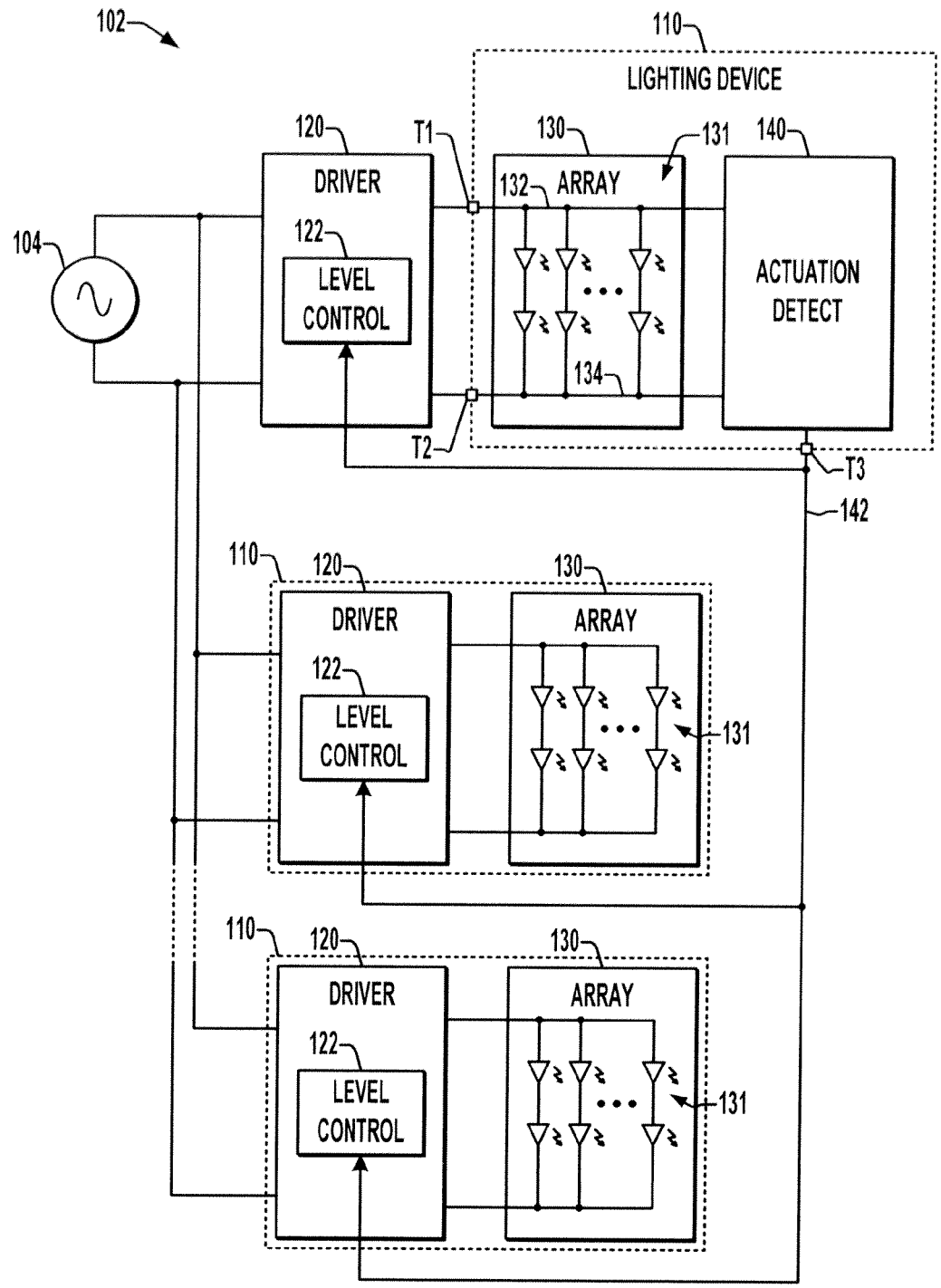

As seen in FIGS. 5-8, the actuation signal 142 provided by the user-actuatable OLED-based lighting device 110 can be used for controlling operational settings of external devices that include their own drivers 120. In this regard, the actuation signal 142 can be used to control other non-lighting devices, such as heating/air-conditioning units, televisions. home appliances, etc. In the embodiments of FIGS. 5 and 6, the user-actuatable lighting device 110 is dimmed according to the actuation signal 142 via a control circuit 122 of an associated driver 120, wherein the associated driver 120 is integrated into the lighting device 110 in the example of FIG. 5 and the associated driver 120 is an external device in the example of FIG. 6. In the examples of FIGS. 5 and 6, the user can operate the actuatable lighting device 110 by pressing an OLED 131 of the light panel 130 to cause the actuatable lighting device and the external lighting devices 110 to dim in unison.

Figure 7:
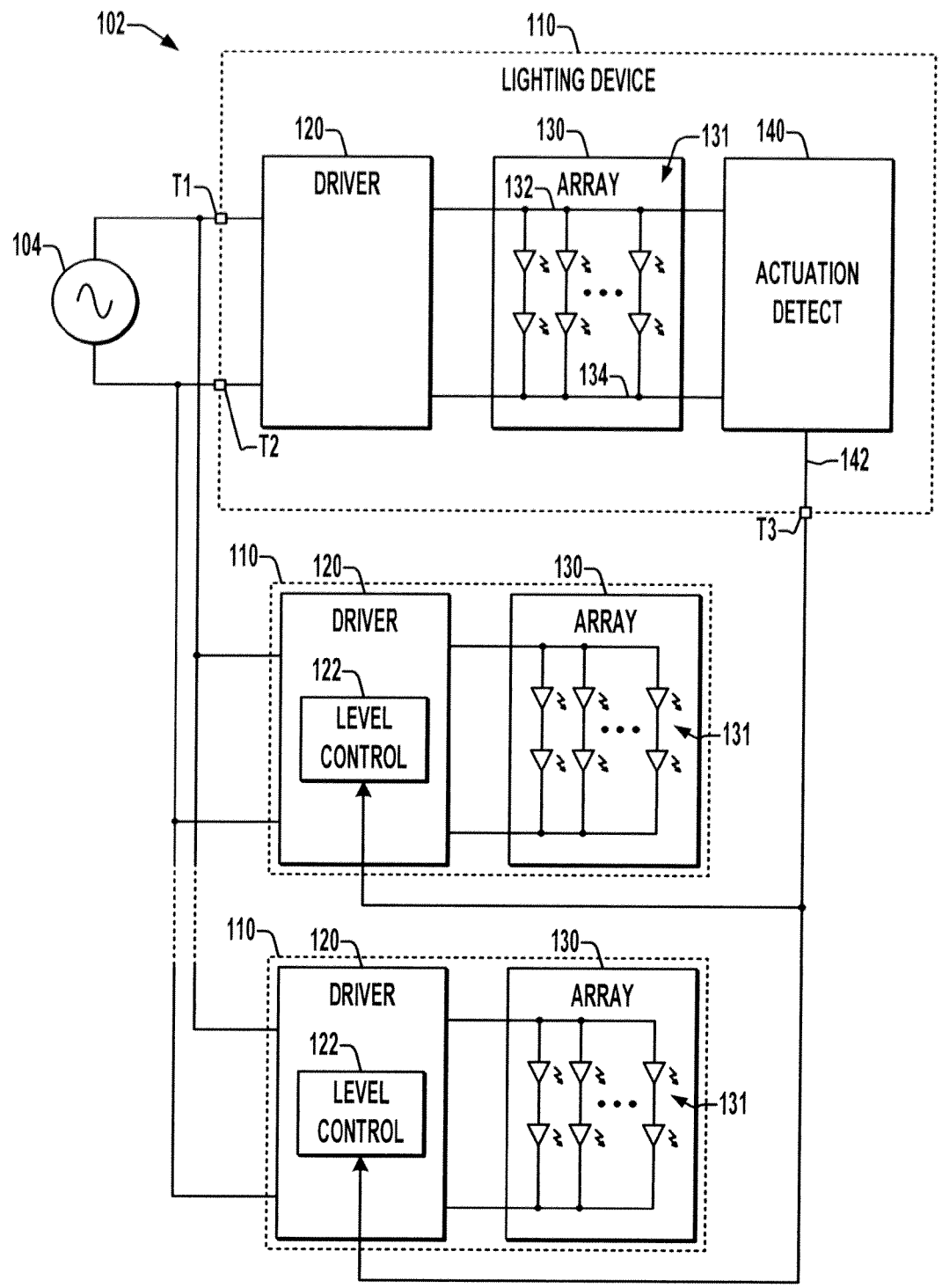
Figure 8:
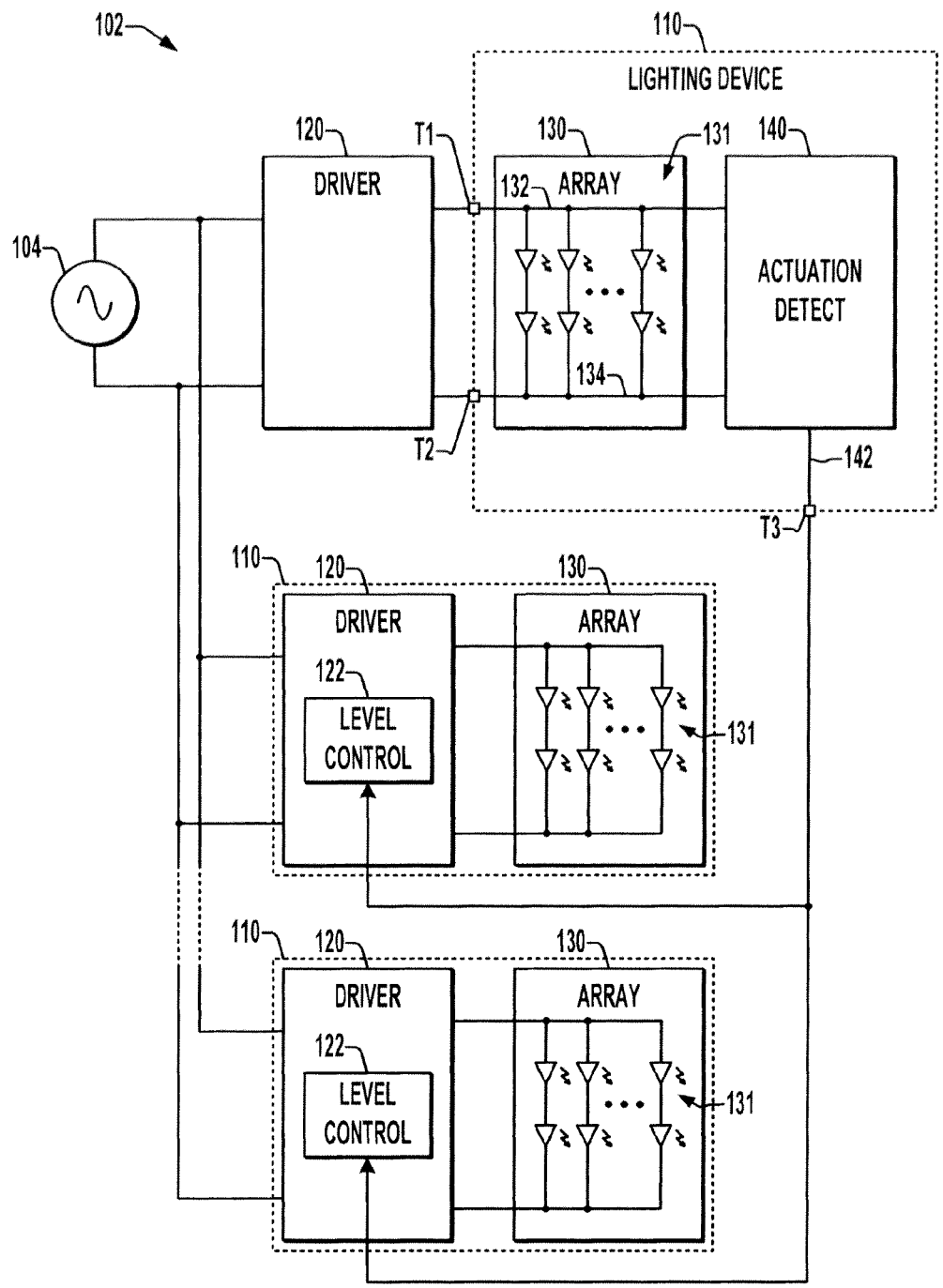

In FIGS. 7 and 8, the user-actuatable OLED-based device 110 is provided with constant DC power from a non-dimming driver 120 (the driver 120 is integral in the example of FIG. 7 and external in the example of FIG. 8). In these embodiments, the user-actuatable lighting device 110 again provides the actuation signal 142 as an output via terminal T3 to one or more external lighting devices 110 which have on-board level control circuits 122 for changing their dimming level. In these examples, the user can operate the actuatable lighting device 110 by pressing its OLED light panel 130 in order to perform one or more controlled operations with respect to the other lighting devices 110, such as dimming in the illustrated example and/or on/off control in other embodiments. Thus, for example, the user-actuatable device 110 may be mounted to a wall to provide general lighting, with the other devices being mounted to the ceiling, such as in a residential dining room. The system configuration shown in these figures allows the user to dim the ceiling lights by pressing the wall mounted lighting device 110.

Figure 9:
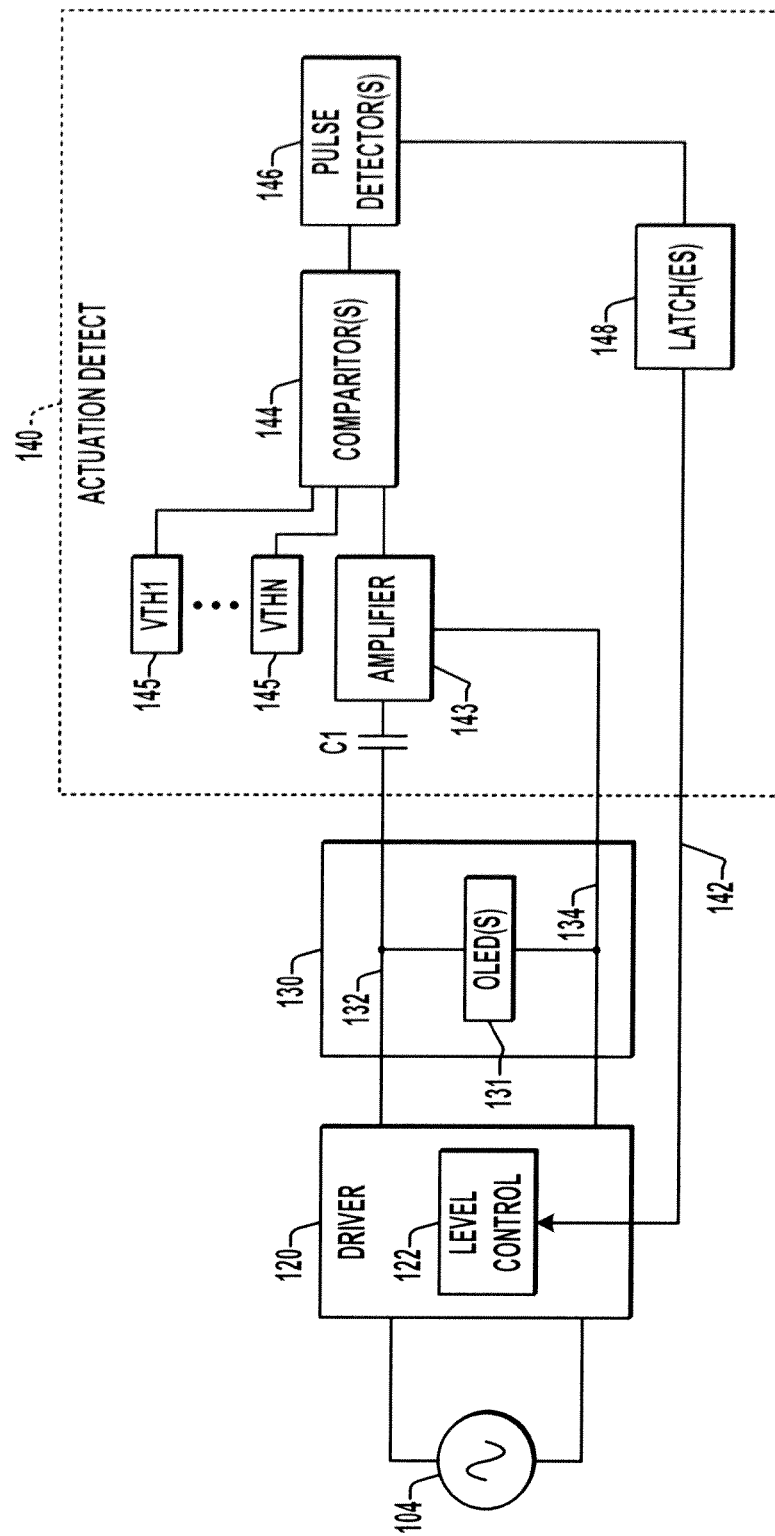
FIG. 9 is a schematic diagram illustrating further details of an exemplary actuation detect circuit in a user-actuatable OLED-based lighting device, in which an AC-coupled signal is amplified and compared with multiple threshold voltages to generate one or more actuation signals for controlling lighting conditions.

FIG. 9 illustrates further details of one embodiment of the actuation detect circuit 140, which is connected to the light panel power connections 132 and 134 of the actuatable light panel 130. A capacitor C1 AC-couples the sensed voltage at the connections 132 and 134, in this case having a first one capacitor terminal connected to the upper power connection 132, and a second terminal connected to an input of an amplifier circuit 143, which can be an op amp circuit in one possible embodiment. The amplifier 143 provides an output to a first input of a comparator circuit 144. The comparator 144 in some embodiments may include a plurality of comparator components or other circuitry by which the output of the amplifier 143 is compared with two or more threshold voltages 145. In such embodiments, the comparator circuit 144 provides a plurality of comparator or comparison outputs to a pulse detector circuit 146. As described below in connection with FIGS. 13 and 14, multiple thresholds can be used to discern whether the user pressed one of a plurality of different portions of the light panel 130, and/or to distinguish between different levels of actuation pressure applied to the panel 130. In a discrete analog implementation, for instance. several comparators can be provided in the circuit 144, each having one input connected to the output of the amplifier 143 as well as another input connected to a corresponding one of the reference threshold voltages 145 and a separate output driving a corresponding pulse detector 146. The pulse detector outputs are then provided to a corresponding plurality of latches circuits 148 which generate the actuation signals 142.

Figure 10:
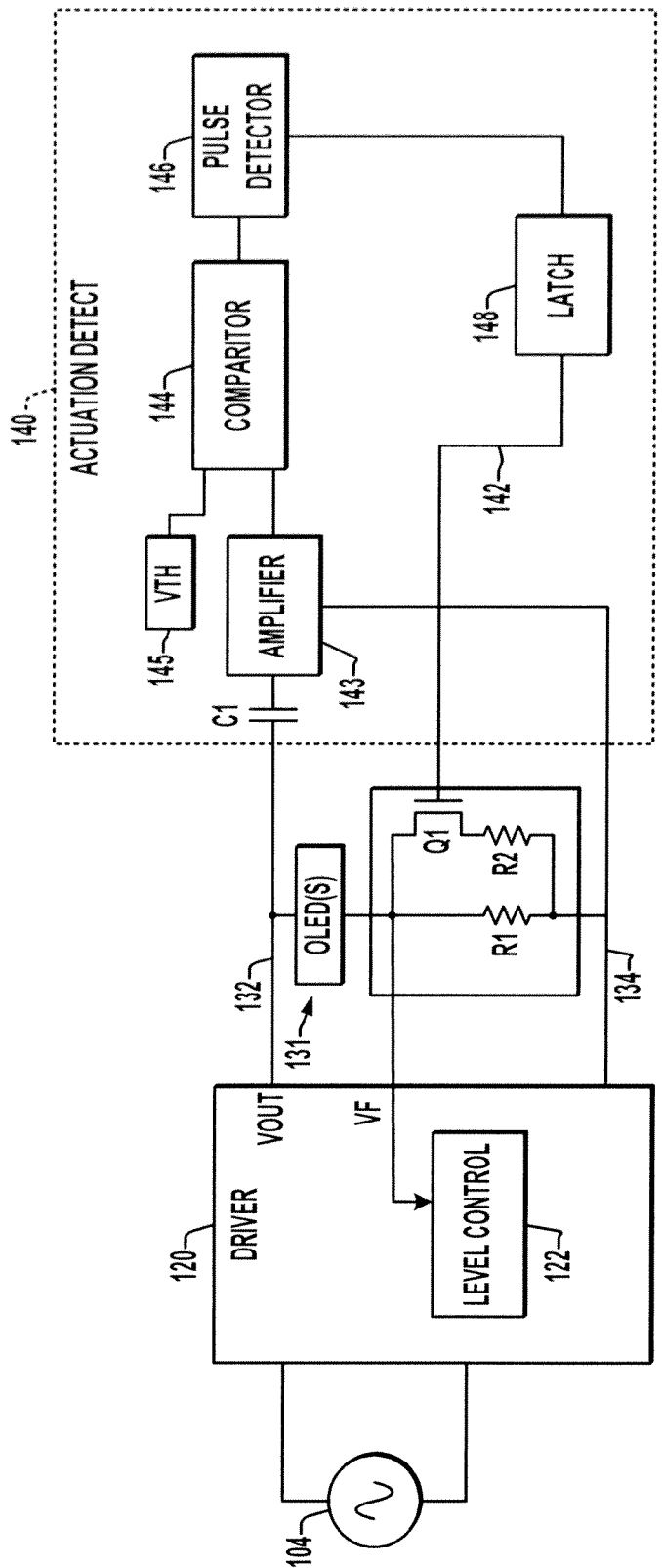
FIG. 10 is a schematic diagram illustrating an exemplary self-dimming OLED-based lighting device with bi-level control according to a user pressing the OLED panel.

FIG. 10 shows another embodiment in which the actuation detect circuit 140 includes an AC coupling capacitor C1 and an amplifier 143 as described above in connection with FIG. 9, with a single comparator circuit 140 for comparing the output of the amplifier 143 with a single reference threshold voltage 145. The output of the comparator drives a pulse detector 146, and a latch 148 provides the actuation signal 142 Co indicate that a detected voltage disturbance or perturbation in the voltage across the power connections 132 and 134, after amplification, has an amplitude greater than the threshold 145. This, in turn, indicates that a user has actuated one or more of the OLEDs 131.

In this embodiment, moreover, the driver 120 includes a feedback voltage input (VF) providing an input to the level control circuit 122 for closed loop current regulation An adjustable feedback circuit is provided in the return path between the OLEDs 131 and the lower power connection 134, which includes a nominal feedback resistor R1 connected in parallel with the series combination of a source to drain channel of a FET Q1 and a second resistor R2. In this embodiment, for one dimming level. the actuation signal 142 turns Q1 off such that the only feedback resistance is that of R1, and the voltage feedback provided to the level control circuit 122 is at a first voltage level. Conversely, if the user actuates the OLED 131, the latch circuit 148 provides an actuation signal 142 to turn Q1 on, whereby the feedback resistance in the return path is the parallel combination of R1 with R2 (in series with the RDSON of Q1), which in turn leads to a change in the level of the voltage feedback provided to the level control circuit 122. Thus, the user can toggle the light output level between two distinct values by merely pressing the actuatable OLED(s) 131, again without requiring any external dimming control device.

Figure 11:
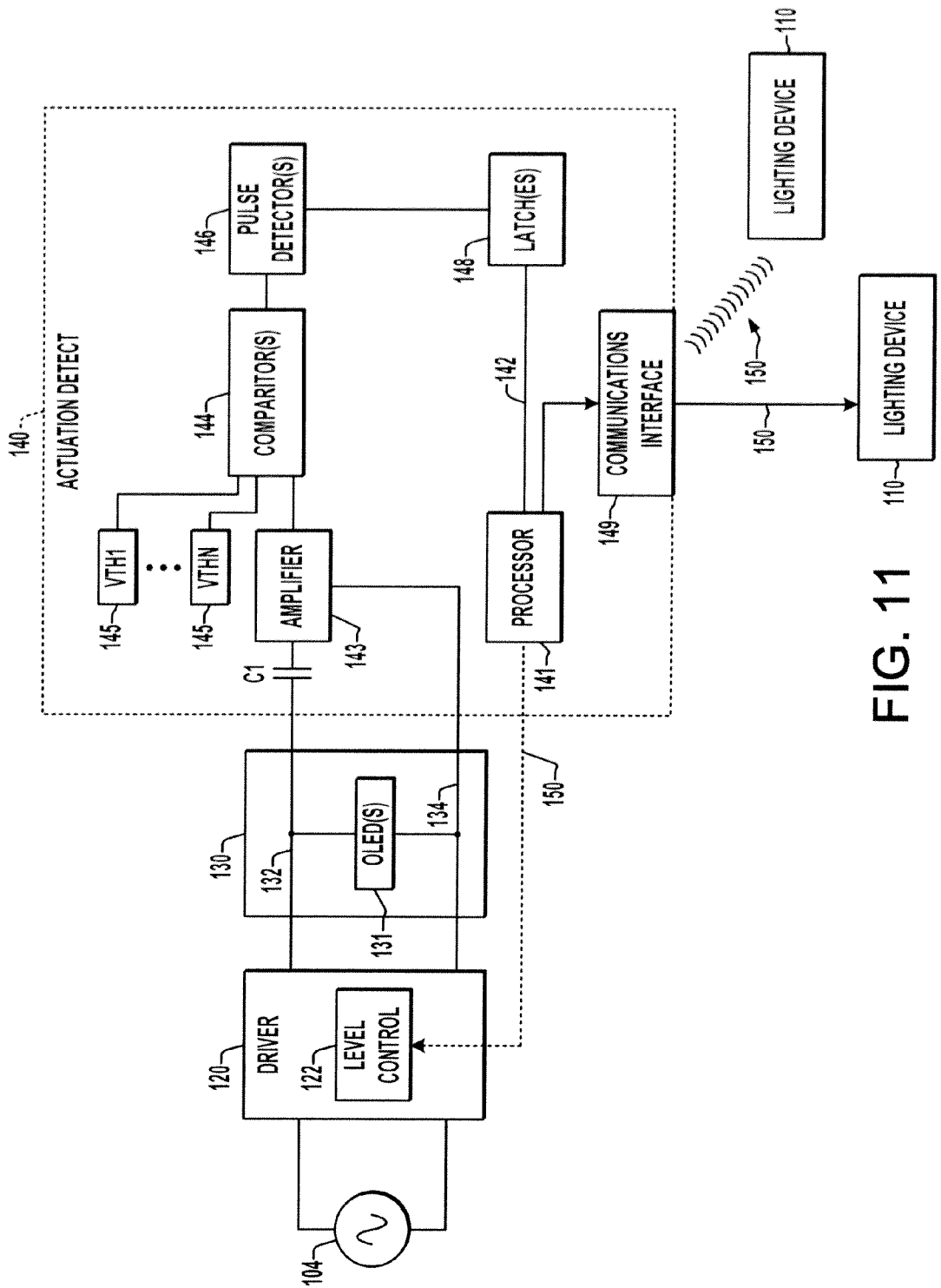
FIG. 11 is a schematic diagram illustrating another exemplary actuation detect circuit embodiment in which a processor receives an actuation control signal based on sensed voltage disturbances caused by user actuation of an OLED panel, and provides one or more actuation control signals or values directly to an associated driver and/or to one or more external lighting devices via a communications interface.

FIG. 11 illustrates another actuation detect circuit embodiment, in which a processor 141 is provided in the actuation detect circuit 140, and receives the actuation signal 142 from the latch circuit 148. In this case, the processor 141 can provide one or more actuation signals or values 150 to a level control circuit 122 of the associated driver 120 (in order to provide dimming control for the user-actuatable OLEDs 131), and/or the processor 141 can provide such actuation signals and/or values 150 via a communications interface 149 of the actuation detect circuit 142 one or more external lighting devices 110 (and/or to one or more non-lighting devices), whether connected by wired or wireless connection.

Figure 12:
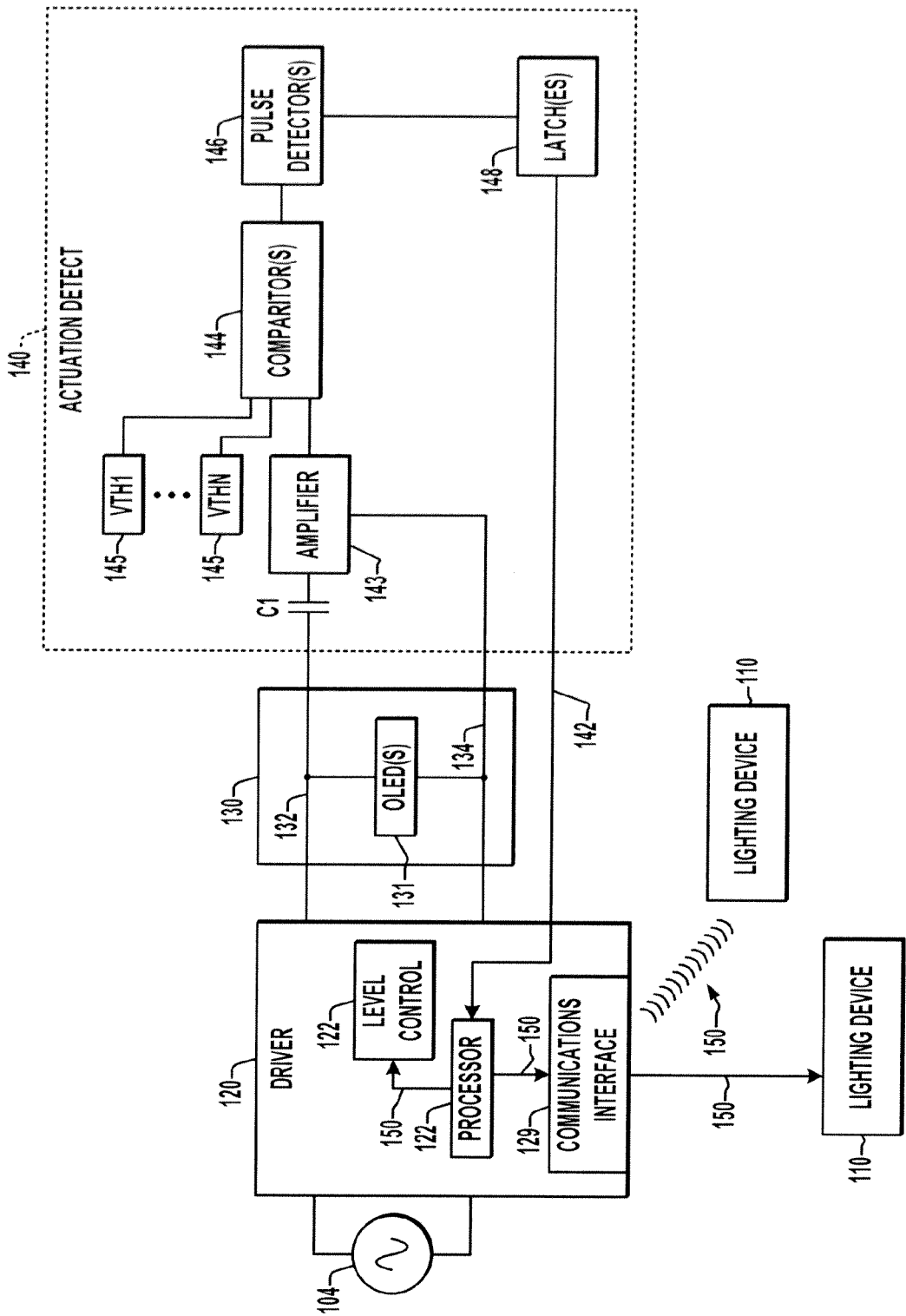
FIG. 12 is a schematic diagram illustrating another embodiment in which a driver includes a processor that receives an actuation signal from the actuation detect circuit and provides actuation control signals or values to control the driver level and/or to control external devices using a communications interface.

FIG. 12 shows yet another possible embodiment, in which a processor 122 and communications interface 129 are provided in the driver 120. In this example, the latch circuit 148 provides the actuation signal(s) 142 to the driver processor 122, which in turn provides one or more actuation signals or values 150 to one or both of the level control circuit 122 of the associated driver 120 and/or to one or more external lighting devices 110 (and/or to one or more non-lighting devices, not shown) via the communications interface 129.

The provision of a processor 141, 129 in one or both of the actuation detect circuit 140 and/or the driver 120 allows an unlimited number of control actions to be taken based on user-initiated actuation of one or more OLEDs 131. For instance, the actuated OLED can be selectively dimmed according to such user initiated actuations. Also, or in combination, one or more external lighting devices 110 can be selectively dimmed and/or turn on or off by such user actuation. In order to facilitate discrimination between unintended actuations of the OLED(s) 131, the actuation detect circuit 140 and/or a processor 122, 149 can be configured to take or initiate such a control action only for actuations causing a sensed perturbation to exceed one or more thresholds as described above, and/or these components may initiate a control action only after two or more perturbations 202 have been detected within a non-zero predetermined time.

Moreover, different control actions can be taken based on a detected frequency of user actuations, for example, dimming by larger increments for a user pressing the OLED 131 quickly, or dimming by small increments for fine-tuned lighting adjustment when the user presses the OLED 131 slowly. Furthermore, a processor 122, 149 can be configured to take different actions based on user actuation frequency and/or based on the amplitude of the voltage perturbation 202, such as dimming up for fast user actuations or for higher amplitude perturbations 202, and dimming down for slow user actuations or for lower amplitude voltage perturbations 202.

In addition, the processor 122, 149 can send signals and/or messages (e.g., via a connected communications interface 129, 149) to any form of controllable device for initiating corresponding control actions, such as changing environmental control settings of a heating/air-conditioning system and/or ceiling fan system, activating/deactivating home security systems, changing settings of home appliances, opening/closing garage doors, answering/adjusting settings of telephones or other communications devices, operating home entertainment systems, interacting with computer systems, etc.

Referring now to FIGS. 13 and 14, graphs 200 and 210 illustrate voltage perturbations 202 having different amplitudes corresponding to the user pressing a given OLED panel 130 in different locations. As seen in the example of FIG. 13, for instance, the amplifier input signal has a perturbation 202 of a relatively high amplitude when the user presses a four segment OLED array 130 approximately in the center area 136. Conversely, FIG. 14 shows a graph 210 illustrating a perturbation 202 at the amplifier input of lower amplitude when the user presses a different location 138 near the edge of the OLED panel 130. As seen in the graphs 200 and 210, the use of two different thresholds TH1 and TH2 allows the actuation detect circuit 140 and/or a processor 122, 149 to distinguish between user actuations of these different portions 136, 138 of the panel 130, thereby allowing the user to perform distinct lighting (or other) control functions by selectively actuating different portions of the panel 130. Moreover, similar threshold-based selective control can be used to distinguish between two or more different levels of user actuation pressure applied to the OLED panel 130. In this regard, a high amplitude perturbation 202 (e.g., FIG. 13) results from a user pressing the panel 130 hard, whereas softer actuations (even at the same location on the panel 130) would result in lower amplitude voltage perturbations 202 (e.g., FIG. 14). Thus, the disclosed lighting devices 110 offer the user the ability to perform distinct (lighting or other) control actions based on actuation pressure, for instance, fast dimming for hard presses of the panel 130, and smaller dimming increments for lighter presses.

Figure 17:
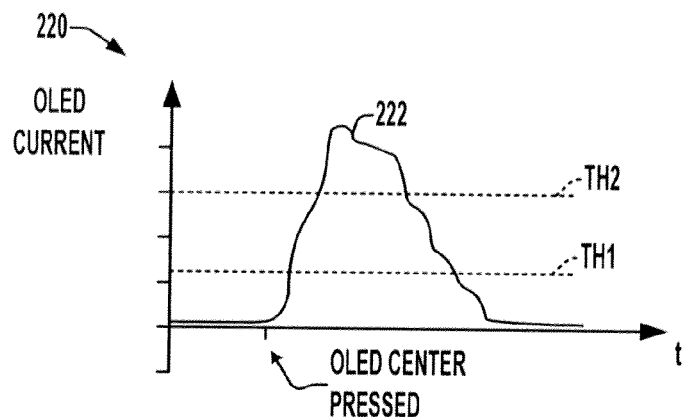
FIGS. 17 and 18 are graphs illustrating detection and differentiation between current perturbations caused by a user pressing different portions of an OLED panel using multiple comparator thresholds.
Figure 17:
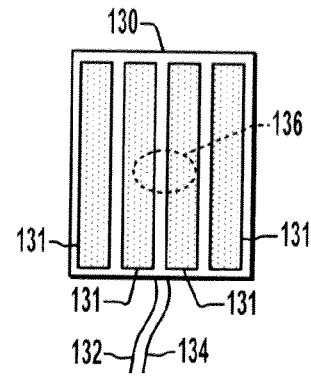
Figure 18:
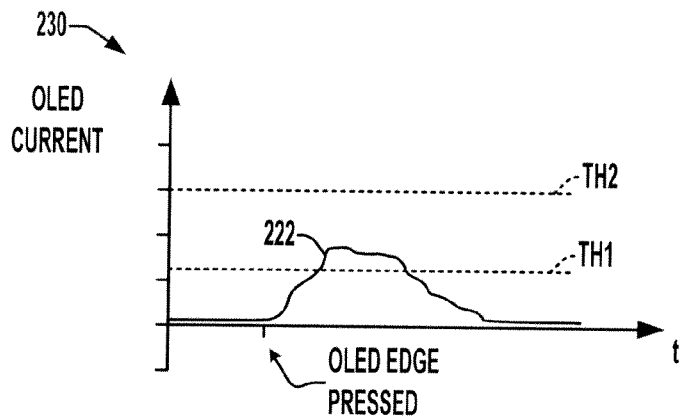
Figure 18:
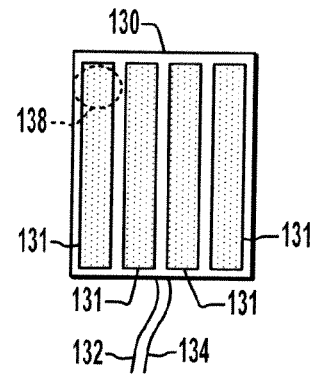

Referring also to FIG. 18, exemplary self-dimming OLED-based lighting devices 110 are illustrated in FIGS. 15 and 16 in which the actuation detect circuit 140 is coupled in series with the first DC connections 132 to detect current perturbations 222 (FIGS. 17 and 18) with onboard and external drivers, respectively. The actuation detect circuit 140 detects current perturbations caused by a user pressing one or more OLEDs 131 of the light panel 130. In these examples, a constant voltage driver source 120 provides a regulated voltage output to the light panel 130, and perturbations 222 in the current flowing through the OLEDs 131 are sensed by the actuation detect circuit 140, which provides one or more actuation signals 142 based at least partially on the sensed current perturbations 222.

As seen in graphs 220 and 230 of FIGS. 17 and 18, the actuation detect circuit 140 can differentiate between current perturbations caused by a user pressing different portions of the OLED panel 130 using different comparator thresholds TH1 and TH2. The graph 220 of FIG. 17 illustrates an exemplary OLED current perturbation 222 having a relatively high amplitude that exceeds both TH1 and TH2 when the user presses a center portion 136 of the panel 130. As seen in the graph 230 of FIG. 18, when the user instead presses a corner portion 138 of the panel 130, a smaller current perturbation 222 results, where the actuation detect circuit 140 can identify this different amplitude as exceeding TH1 but not exceeding the second threshold TH2. In these embodiments, any suitable current sensing/detection techniques and/or circuitry can he employed in the actuation detect circuit 140 by which perturbations to 22 in an otherwise generally constant DC current can be sensed, such as using amplifiers, comparators, pulse detectors and/or latches (e.g., as seen in the voltage perturbations examples of FIGS. 9-11 above). The actuation detect circuit 140 outputs an actuation signal 142 (and/or may output one or more actuation signals or values 150, for instance, via a processor) to one or more external devices for performing self-dimming and/or for performing one or more control actions.

Figure 19:
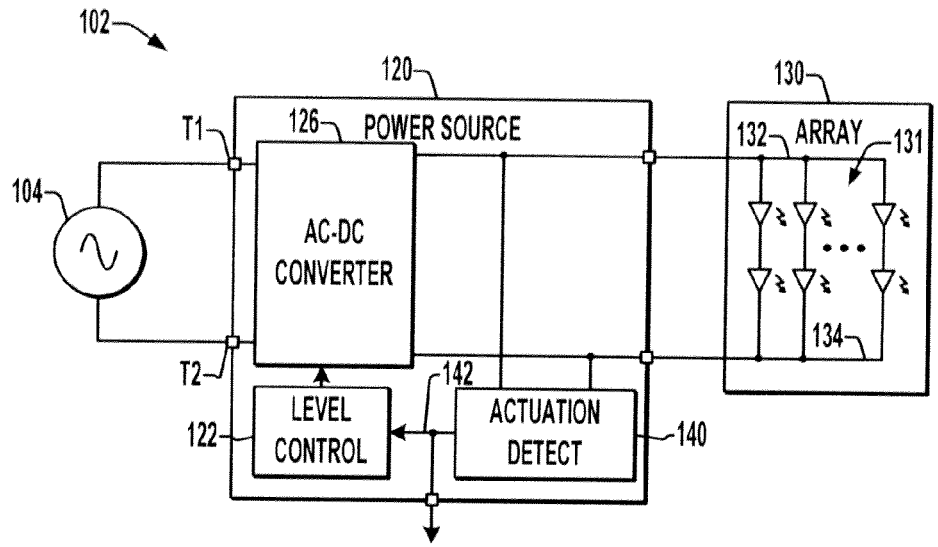
FIGS. 19 and 20 are schematic diagrams illustrating driver circuits with AC-DC converters and actuation detect circuits for driving and detecting physical actuation of a connected light panel.
Figure 20:
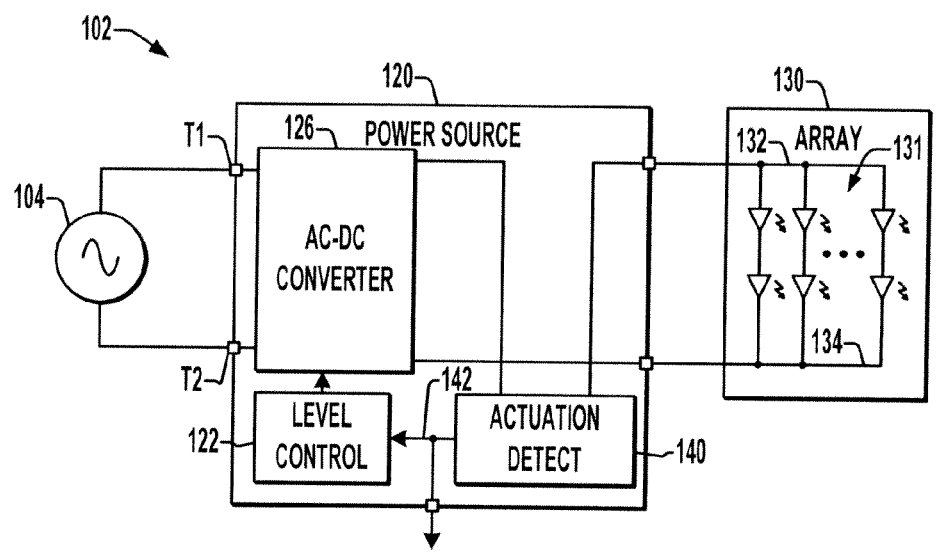

Referring also to FIGS. 19 and 20, FIG. 19 shows an exemplary power source 120 that includes an AC-DC converter (driver circuit) 126 with first and second inputs connected to terminals T1 and T2, respectively, for receiving AC input electrical power, as well as output terminals for connection to DC power connections 132 and 134 of a connected light panel 130. The converter 126 is operative to convert the input electrical power from an AC source 104 to provide DC electrical power via the outputs 132 and 134 to one or more solid-state lighting components (OLEDs 131) of the light panel 130 to generate general lighting. The power source 120 also includes a level control circuit 122 that operates the AC-DC converter 126 to provide a regulated output DC current to the OLEDs 131. The power source 120 in this case incorporates an actuation detect circuit 140 generally as described above, which senses perturbations 202 in the voltage across the driver outputs 132 in 134 caused by a user pressing or otherwise physically actuating one or more of the OLEDs 131 while the converter 126 provides power thereto. The actuation detect circuit 140 selectively provides one or more actuation signals 142 to the level control circuit 122 and/or to one or more external devices (not shown) via an optional signal output terminal.

FIG. 20 illustrates another embodiment in which the power source 120 includes a constant voltage AC-DC converter (driver circuit) 126 that receives input AC power from the source 104 and provides a regulated voltage DC output current tor driving one or more OLEDs 131 connected to the source 120. In this embodiment, the actuation detect circuit 140 senses perturbations (222 in FIGS. 17 and 18 above) in a current flowing from the converter 126 through the OLED(s) 131 of a connected light panel 130 caused by physical actuation of one or more of the OLEDs 131 by a user. In addition, the actuation detect circuit 140 selectively provides one or more actuation signals 142 to the level control circuit 122 operating the converter 126 and/or to an external device.

The disclosure thus provides lighting devices 110 (e.g. FIGS. 1-8 above) including an actuation detect circuit 140 and solid-state light panel 130, alone or in combination with an associated driver 120, as well as actuation detect circuits 140 that may be connected to an associated light panel 130. In addition, the disclosure provides power sources 120 including drivers 126 as well as an integrated actuation detect circuit 140 that can be coupled to a solid-state lighting panel 130.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof which performs the specified function of the described component (i.e., that is functionally equivalent), even though not structurally equivalent to the disclosed structure which performs the function in the illustrated implementations of the disclosure. Although a particular feature of the disclosure may have been illustrated and/or described with respect to only One of several implementations, such feature may he combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising". The invention has been described with reference to the preferred embodiments. Obviously, modifications and alterations will occur to others upon reading and understanding the preceding detailed description. It is intended that the invention be construed as including all such modifications and alterations.

The following is claimed:

1. A lighting device, comprising:
   a light panel comprising:
      first and second light panel power connections for receiving DC electrical power from a driver, and
      at least one organic light emitting diode (OLED) operatively coupled between the first and second light panel power connections to provide general lighting using current provided by the driver;
   an actuation detect circuit operatively coupled with the light panel to sense a perturbation in a voltage across the first and second light panel power connections or in a current flowing through the at least one OLED caused by a physical actuation of the at least one OLED by a user while the at least one OLED is providing general lighting, and to selectively provide at least one actuation signal based at least partially on the sensed perturbation, the actuation detect circuit comprising:
      an amplifier comprising an input and an output;
      a capacitance coupled between one of the first and second light panel power connections and the input of the amplifier;
      a comparator comprising:
         a first comparator input coupled with the output of the amplifier,
         a second comparator input coupled with a threshold voltage, and
         a comparator output with an output voltage set according to relative polarities of voltages at the first and second comparator inputs;
      a pulse detector operatively coupled with the comparator to detect the output voltage of the comparator output and to provide a pulse detector output based on the output voltage of the comparator output; and
      a latch operative to latch the pulse detector output to provide the at least one actuation signal.

2. The lighting device of claim 1, where the actuation detect circuit is operative to compare an amplitude of the sensed perturbation with a threshold, and to selectively provide the at least one actuation signal if the amplitude of the sensed perturbation is greater than the threshold.

3. The lighting device of claim 2, where the actuation detect circuit is operative to compare the amplitude of the sensed perturbation with a plurality of thresholds, and to selectively provide the at least one actuation signal based at least partially on which of the plurality of thresholds are exceeded by the amplitude of the sensed perturbation.

4. The lighting device of claim 3, where the actuation detect circuit selectively provides a plurality of actuation signals to indicate which of the plurality of thresholds are exceeded by the amplitude of the sensed perturbation.

5. The lighting device of claim 2, where the actuation detect circuit comprises a processor operative to selectively provide at least one actuation signal or value if the amplitude of the sensed perturbation is greater than the threshold.

6. The lighting device of claim 5, where the processor is operative to provide the at least one actuation signal or value only if a plurality of perturbations with amplitudes greater than the threshold are sensed within a non-zero predetermined time.

7. The lighting device of claim 1, where the actuation detect circuit comprises a processor operative to selectively provide at least one actuation signal or value based at least partially on the sensed perturbation.

8. The lighting device of claim 7, where the processor is operative to provide the at least one actuation signal or value only if a plurality of perturbations are sensed within a non-zero predetermined time.

9. The lighting device of claim 7, where the processor is operative to selectively provide different actuation signals or values based at least partially on an amplitude of the sensed perturbation.

10. The lighting device of claim 7, further comprising a communications interface operative to transmit messages to at least one external device, where the processor is operative to provide the at least one actuation signal or value to the communications interface for transmission to the at least one external device.

11. The lighting device of claim 1, further comprising a driver operative to provide DC electrical power to the light panel via the first and second light panel power connections.

12. The lighting device of claim 11, where the actuation detect circuit is operative to provide the at least one actuation signal to the driver, and where the driver is operative to selectively change an amount of DC electrical power provided to the light panel based at least partially on the at least one actuation signal.

13. The lighting device of claim 11, further comprising a communications interface operative to transmit messages including at least one actuation signal or value to at least one external device based at least partially on the sensed perturbation.

14. The lighting device of claim 1, further comprising a communications interface operative to transmit messages including at least one actuation signal or value to at least one external device based at least partially on the sensed perturbation.

15. An actuation detect circuit for detecting a physical actuation of one or more organic light emitting diodes (OLEDs) of a light panel providing general lighting, the actuation detect circuit comprising:
   at least one light panel power connection for sensing a voltage or current associated with at least one OLED of a light panel;
   a detect circuit operatively coupled with the at least one light panel power connection to sense a perturbation in a voltage across the at least one OLED or in a current flowing through the at least one OLED caused by a physical actuation of the at least one OLED by a user while the at least one OLED is providing general lighting, the detect circuit comprising:
      an amplifier comprising an output and an input that is AC coupled with the at least one light panel power connection,
      a comparator comprising:
         a first comparator input coupled with the output of the amplifier,
         a second comparator input coupled with a threshold voltage, and
         a comparator output with an output voltage set according to relative polarities of voltages at the first and second comparator inputs,
      a pulse detector operatively coupled with the comparator to detect the output voltage of the comparator output and to provide a pulse detector output based on the output voltage of the comparator output, and
   a latch operative to latch the pulse detector output to provide the at least one actuation signal.

16. A power source for a lighting system, comprising
   a driver circuit having first and second inputs for receiving input electrical power, and first and second driver outputs, the driver circuit operative to convert the input electrical power to provide DC electrical power via the first and second driver outputs to at least one organic light emitting diode (OLED) of a connected light panel to cause the at least one OLED to provide general lighting;
   an actuation detect circuit operatively coupled with the connected light panel to sense a perturbation in a voltage across the first and second driver outputs or in a current flowing through at least a portion of the connected light panel caused by a physical actuation of the at least one OLED by a user while the driver circuit is providing DC electrical power to the at least one OLED, the actuation detect circuit operative to selectively provide at least one actuation signal based at least partially on the sensed perturbation, the actuation detect circuit comprising:
   an amplifier comprising an input and an output:
   a capacitance coupled between one of the first and second light panel power connections and the input of the amplifier;
   a comparator comprising:
      a first comparator input coupled with the output of the amplifier,
      a second comparator input coupled with a threshold voltage, and
      a comparator output with an output voltage set according to relative polarities of voltages at the first and second comparator inputs:
   a pulse detector operatively coupled with the comparator to detect the output voltage of the comparator output and to provide a pulse detector output based on the output voltage of the comparator output; and
   a latch operative to latch the pulse detector output to provide the at least one actuation signal.

17. The power source of claim 16, wherein the actuation detect circuit provides the at least one actuation signal to the driver circuit, and where the driver circuit is operative to selectively adjust an amount of DC electrical power provided to the at least one OLED based at least partially on the at least one actuation signal.

18. The power source of claim 16, further comprising a signal output, wherein the actuation detect circuit provides the at least one actuation signal to the signal output.

19. A method of controlling at least one lighting device, the method comprising:
   providing DC electrical power to a light panel having at least one organic light emitting diode (OLED) to cause the at least one OLED to provide general lighting;
   sensing a perturbation in a voltage across first and second power connections of the light panel or in a current flowing through the at least one OLED caused by physical actuation of the at least one OLED by a user while the at least one OLED is providing general lighting, comprising:
  amplifying a capacitively coupled signal from at least one of the first and second power connections to provide an amplified output,
  providing a comparison signal based on relative polarities of voltages of the amplified output and at least one threshold voltage,
  providing a pulse signal based on the comparison signal, and
  latching the pulse signal to provide at least one actuation signal; and
controlling at least one operational parameter of at least one device based at least partially on the at least one actuation signal.

* * * * *